United States Patent
Banerjee

(10) Patent No.: US 6,755,962 B2
(45) Date of Patent: Jun. 29, 2004

(54) COMBINED THERMAL AND CATALYTIC TREATMENT OF HEAVY PETROLEUM IN A SLURRY PHASE COUNTERFLOW REACTOR

(75) Inventor: Dwijen K. Banerjee, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 239 days.

(21) Appl. No.: 09/852,107

(22) Filed: May 9, 2001

(65) Prior Publication Data

US 2002/0166797 A1 Nov. 14, 2002

(51) Int. Cl.$^7$ .............................................. C10G 47/00
(52) U.S. Cl. ......................... 208/67; 208/68; 208/113; 208/108; 208/111.01; 208/153; 208/157; 208/163; 208/166
(58) Field of Search ............................ 208/67, 68, 113, 208/100, 111.01, 153, 157, 163, 166

(56) References Cited

U.S. PATENT DOCUMENTS

| | | | |
|---|---|---|---|
| 1,895,769 A | * 1/1933 | Pier et al. | 208/108 |
| 1,923,576 A | * 8/1933 | Krauch et al. | 208/108 |
| 3,147,210 A | 9/1964 | Hass et al. | 208/210 |
| 3,378,482 A | * 4/1968 | Doane | 208/108 |
| 4,194,964 A | * 3/1980 | Chen et al. | 208/108 |
| 4,213,847 A | * 7/1980 | Chen et al. | 208/111 |
| 4,510,037 A | 4/1985 | Johanson et al. | 208/8 |
| 4,755,281 A | * 7/1988 | Penick | 208/108 |
| 4,820,503 A | * 4/1989 | Wang et al. | 423/362 |
| 5,603,904 A | 2/1997 | Bachtel et al. | 422/143 |
| 5,733,440 A | 3/1998 | Stangeland et al. | 208/148 |
| 5,916,529 A | 6/1999 | Scheuerman | 422/141 |
| 5,939,031 A | 8/1999 | Ellis et al. | 422/191 |
| 6,117,306 A | 9/2000 | Morel et al. | 208/89 |
| 6,153,086 A | * 11/2000 | Gupta et al. | 208/59 |
| 6,436,279 B1 | * 8/2002 | Colyar | 208/108 |

* cited by examiner

*Primary Examiner*—Walter D. Griffin
*Assistant Examiner*—James Arnold, Jr.
(74) *Attorney, Agent, or Firm*—Kim S. Manson

(57) ABSTRACT

A slurry phase reactor is designed to treat extra heavy petroleum crude in a combination of thermal-zone and catalytic-zone in a counterflow system where liquid feed is added to the top and hydrogen at the bottom. Feed enters the gas-phase thermal zone, where it passes to a liquid-phase thermal zone. In the liquid-phase thermal zone, the hydrocarbon is thermally cracked and the unreacted liquid is further passed to a catalytic-zone below in communication with the thermal-zone. Catalyst can be added or removed as required in a continuous mode without shutting down the system. The heat generated inside the catalytic cracking zone is distributed to the entire reactor as the gaseous product flows upward. Feed is brought to the reaction conditions by the heat recovered from the gas-phase zone. Reaction temperature could be controlled by feed temperature.

13 Claims, 2 Drawing Sheets

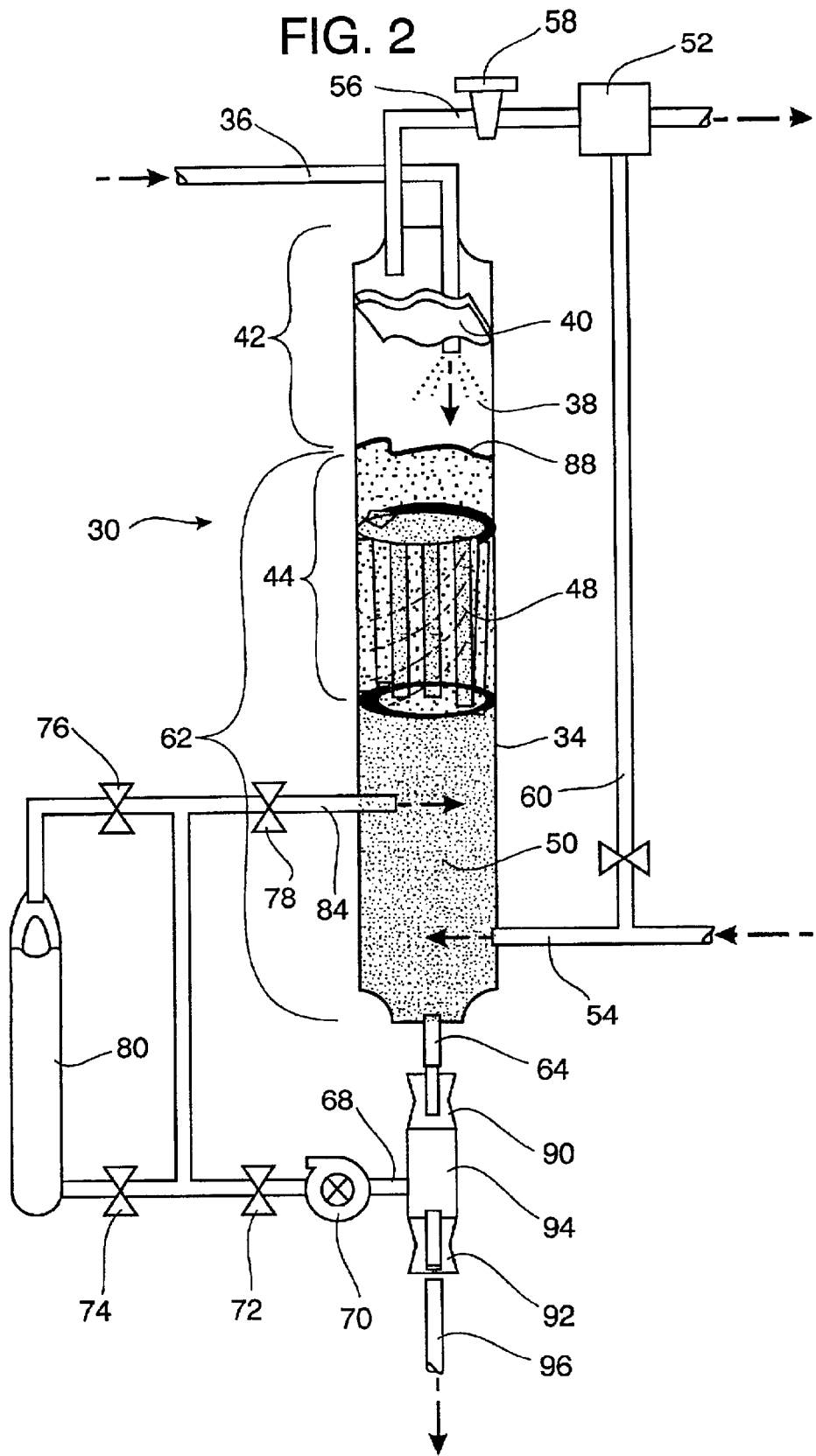

COMBINED THERMAL AND CATALYTIC TREATMENT OF HEAVY PETROLEUM IN A SLURRY PHASE COUNTERFLOW REACTOR

BACKGROUND OF THE INVENTION

1. Field of the Invention

The present invention relates to a reactor process and apparatus to treat extra heavy crude petroleum containing high concentrations of asphaltenes, acids, metals and heteroatoms. In particular, the present invention is directed to a reactor and a process which combines thermal and catalytic treatment of heavy petroleum liquid in a slurry phase counterflow reactor, where liquid feed is fed from the top and hydrogen from the bottom.

2. Prior Art

Various designs have been utilized in the past for hydrotreatment of heavy petroleum oil in cocurrent mode in a slurry reactor. For example, FIG. 1 illustrates a typical conventional up-flow cocurrent slurry reactor. In this type of known reactor, a liquid petroleum feedstock and hydrogen are introduced to the bottom of a reactor vessel. The gaseous hydrocarbon product is removed from the top of the vessel after reaction.

Likewise, fixed bed catalyst systems for hydrotreatment of heavy petroleum crude are known. Fixed bed catalyst systems in the past have had two difficulties. The catalyst bed may get flooded and heavy oil tends to plug the bed.

There have also been a number of attempts at countercurrent reactor technology to treat lighter petroleum feed. U.S. Pat. No. 3,147,210 to Hass et. al. entitled TWO STAGE HYDROGENATION PROCESS illustrates a combination of cocurrent and countercurrent hydro processing of lighter hydrocarbons in a fixed bed catalyst system. An initial feedstock is subjected to catalytic hydrofining in cocurrent flow and then subjected to catalytic hydrogenation over a noble metal catalyst in countercurrent flow with hydrogen.

U.S. Pat. No. 5,939,031 to Ellis et. al. entitled COUNTERCURRENT REACTOR describes a countercurrent reactor design in a fixed bed catalytic hydroprocessing system. A bypass system is provided to overcome the problem of flooding the catalyst bed. The design illustrates a combination of a fixed bed reactor along with elements of a slurry reactor. Neither of the above-mentioned designs are suitable for heavy resid.

A countercurrent reactor has also been used to treat coal and oil sands as shown in Johanson et. al. U.S. Pat. No. 4,510,037 entitled HYDROGENATION PROCESS FOR SOLID CARBONACEOUS FEED MATERIALS.

There remains a need to provide a slurry phase reactor which will overcome the problems inherent with fixed bed catalyst reactors and cocurrent slurry phase reactors.

There is also a need to provide a process and apparatus for simultaneous and combined thermal and catalytic treatment of extra heavy crude oil.

There is a further need for a combined thermal and catalytic reactor having a hydrogen counter flow system.

There is a further need to provide a combined thermal and catalytic reactor wherein the heat required in the thermal phase zone is obtained from heat of reaction in the catalyst zone.

There is a further need to provide a reactor having a gas-phase thermal reaction zone, a liquid thermal reaction zone and a catalytic reaction zone which are integral within a single reactor vessel.

SUMMARY OF THE INVENTION

The present invention provides for combined thermal and catalytic treatment of heavy petroleum in a slurry phase counterflow reactor. The reactor system includes a reactor vessel which is typically vertically oriented and has three discrete regions.

Liquid feedstock, such as extra heavy petroleum crude oil, is brought to the reactor vessel through a feedstock inlet line which is in communication with the top of the reactor vessel in a gas phase thermal reaction zone. The liquid feedstock may be introduced via a nozzle into the reactor vessel below the level of a porous metal filter screen. The gas phase thermal reaction zone provides sufficient heat to the incoming feed to reach the reaction temperature so that thermal decomposition occurs. Lighter product is carried over by hydrogen through an outlet at the top.

Below the gas phase zone and in communication therewith is a liquid phase thermal reaction zone within the reactor vessel. Feedstock in liquid form from the gas phase thermal reaction zone passes by gravity to the liquid phase thermal reaction zone. To assist and encourage mixing within the liquid phase zone with upflowing hydrogen, a plurality of baffles extend from the interior wall of the reactor vessel and extend radially inward toward the axis of the vessel. In this zone, further thermal cracking takes place.

Heavier liquid within the liquid phase thermal reaction zone passes to a catalytic reaction zone below the liquid phase thermal reaction zone. Hot hydrogen gas is introduced and injected into the reactor vessel at the catalytic reaction zone through a hydrogen gas inlet. The hot hydrogen gas bubbles upward through the reactor vessel in countercurrent mode to the downward movement of the liquid feedstock. The hydrogen gas also assists in carrying the gaseous hydrocarbon product which is formed from the thermal and the catalytic treatment occurring within the reactor vessel.

Unconverted heavy residue along with solids (catalysts, metals and coke formed) are withdrawn from the bottom of the reactor.

The hydrogen gas and the gaseous hydrocarbon product move upward within the reactor vessel and are removed from the reactor vessel by a product outlet line in fluid communication with the top of the vessel. The hydrogen gas and gaseous hydrocarbon product are thereafter allowed to cool whereby the hydrocarbon product condenses to a liquid. At least a portion of the hydrogen gas is recycled through a hydrogen gas return line back to the hydrogen gas inlet.

The catalytic reaction zone will contain the desired amount and quantity of catalysts to chemically hydrogenate the liquid. Catalysts may be added or removed without shutting down of the process through a catalyst addition system. A portion of the residual stream exiting the outlet line at the bottom of the reactor may be directed through a buffer tank having a catalyst addition system. Accordingly, the amount of catalyst may be varied and controlled. Finally, the unconverted residual material having passed through the buffer tank returns to the catalytic reaction zone of the reactor vessel via a return line. This provides an additional advantage for further hydrogenation of unconverted residue.

BRIEF DESCRIPTION OF THE DRAWINGS

FIG. 2 illustrates a flow diagram of the present invention providing combined thermal and catalytic treatment of heavy petroleum in a slurry phase counter current reactor.

DETAILED DESCRIPTION OF THE PREFERRED EMBODIMENTS

Figure 1:
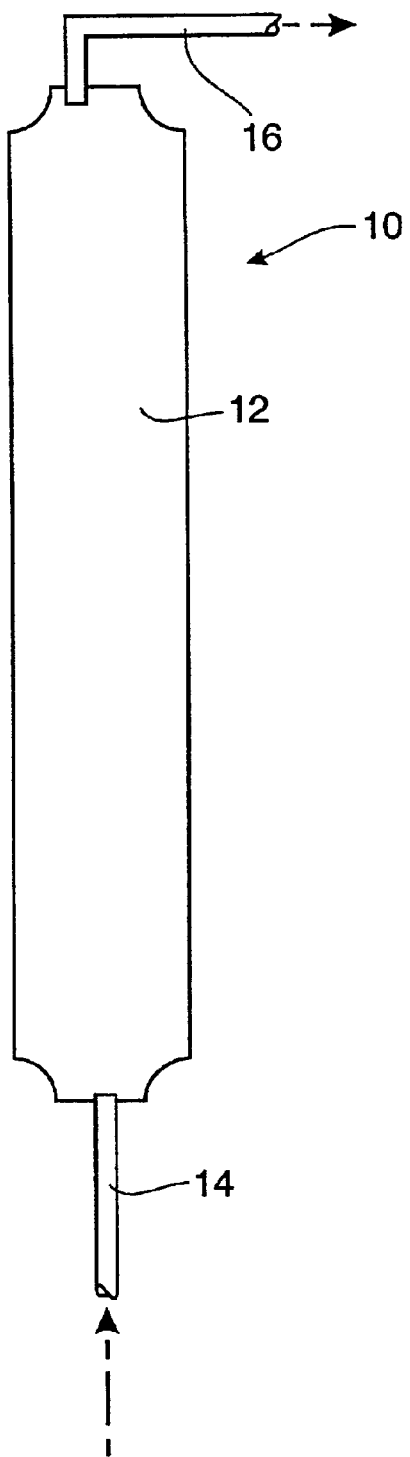
FIG. 1 illustrates a flow diagram of a conventional, cocurrent slurry reactor as known in the prior art.

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Referring to the drawings in detail, FIG. 1 illustrates atypical conventional cocurrent slurry reactor 10 as found in the prior art. The conventional reactor system includes a reactor vessel 12 having an inlet 14 at the base of the reactor vessel wherein heavy petroleum oil feedstock and hydrogen gas are introduced. Following reaction in the vessel, the hydrocarbon product is removed via outlet 16 from the top of the reactor vessel 12. The feedstock and the hydrogen gas move through the reactor in the same direction or cocurrently.

FIG. 2 illustrates a flow diagram of the present invention providing combined thermal and catalytic treatment having a counter flow slurry reactor design. The reactor system 30 includes a reactor vessel 34 which is typically vertically oriented. As will be described herein, the reactor vessel will contain three zones. By way of example and not by limitation, a reactor vessel 34 constructed in accordance with the present invention may be substantially cylindrical although other arrangements are possible within the teachings of the present invention.

Liquid feedstock, such as extra heavy petroleum crude oil, is brought to the reactor vessel 34 through a feedstock inlet line 36 which is in communication with the top of the reactor vessel in a gas-phase thermal reaction zone 38. By way of example, the temperature of the incoming feedstock may be 150° to 500° F. (80° C.–250° C.). The liquid feedstock is introduced and delivered into the reactor vessel 34 through a nozzle below the level of an optional porous metal filter screen 40, which is designed to minimize liquid surges or splashing.

The gas-phase thermal reaction zone 38 is kept such that incoming feed stock is heated to a suitable reaction temperature so that thermal decomposition occurs in the gas-phase zone 38. The height of the gas-phase zone is shown by arrow 42. Below the gas-phase thermal reaction zone within the reactor vessel 34 and in fluid communication therewith is a liquid phase thermal reaction zone 44.

Liquid from the gas-phase thermal reaction zone 38 passes by gravity to the liquid phase thermal reaction zone 44. The liquid feedstock is further thermally reacted within the liquid thermal reaction zone 44 which is kept at a reaction temperature. To assist and encourage mixing of hydrogen gas bubbling within the liquid phase thermal zone, a plurality of baffles 48 extend from the interior wall of the reactor vessel 34 radially inward toward the axis of the vessel.

Unconverted liquid within the liquid phase thermal reaction zone 44 passes to a catalytic reaction zone 50 which is below the liquid phase thermal reaction zone 44 and in fluid communication therewith. The liquid descends by gravity as it becomes heavier and heavier.

Hydrogen gas is injected into the reactor vessel at the catalytic reaction zone through hydrogen gas inlet 54. In a preferred embodiment, the hydrogen gas is hot and pure although a gas substantially of hydrogen may be used. The hot hydrogen is dispersed by gas bubbling upward through the reactor vessel 34 in countercurrent mode to the movement of the liquid feedstock. Unconverted heavier resid gets hydrogenated in the presence of catalyst and hydrogen in this zone 50. The reaction, being exothermic, produces heat. The heat of reaction in zone 50 supplies heat to zones 42 and 44. Additional heat can be supplied from the hot hydrogen gas or other sources. The hydrogen gas also assists in carrying the gaseous hydrocarbon product which is formed from the thermal and the catalytic treatments, such as cracking, occurring within the reactor vessel 34.

The hot hydrogen gas and the gaseous hydrocarbon product are removed from the reactor vessel via a product outlet line 56 which is in fluid communication with the top of the reactor vessel in the gas-phase thermal reaction zone. Removing the product as it forms avoids unnecessary secondary cracking of the product.

The hot gas may also be passed in heat exchange with the incoming feedstock in the feedstock inlet line 36. The hydrogen gas and gaseous product removed through the outlet line 56 pass through a filter illustrated at 58 to remove solids trapped therein. One example of a filter would be a mechanical screen duplex filter.

The combined hydrogen gas and gaseous hydrocarbon product are cooled as illustrated by box 52 so that a large portion of the gaseous hydrocarbon product will condense and change to liquid, thereby separating it from the hydrogen gas. It is preferred that at least a portion of the hydrogen gas is recycled via hydrogen recycle line 60 back to the hydrogen gas inlet 54. Accordingly, it is preferred that the hot hydrogen gas is recycled in the system.

The liquid level in the reactor vessel 34 (the combined level of the catalytic reaction zone and the thermal liquid phase zone 44) may be controlled. The combined liquid level is shown by arrow 62. By way of example but not by way of limitation, 80% of the reactor height may be in the combined liquid phase.

A liquid level detector 88 may be utilized to determine the level of liquid within the vessel. The liquid level detector may take various forms. In one example, a radioactive signal can penetrate the sidewall of the reactor vessel in order to detect the liquid level therein. If the liquid level is too great, either the incoming feedstock can be slowed or stopped or a valve 90 in a residual outlet line 64 may be opened.

The unconverted residual liquid product which has been both thermally and catalytically treated may be removed from the reactor vessel 34 at the bottom of the reactor vessel via a residual outlet line 64.

By way of example, a typical operating pressure in the vessel might be 1500–2500 PSIG (approximately 1–10 MPa) at typical temperatures of 450° F.–850° F. The valves 90 and 92, in combination with storage area 94 in the residual outlet line 64, provide a pressure let down system. Opening valve 90 after closing valve 92 will permit liquid to move into storage area 94. Once valve 90 has again been closed, the liquid may be removed through line 96 by opening valve 92. This will cause the pressure in the system to be lowered.

The catalytic reaction zone 50 will contain a desired amount of hydrocarbon conversion catalyst such as hydrocracking catalyst. Various types of catalyst may be used. Catalyst may be chosen from hydrogenation and hydrocracking catalysts. Such catalysts are typically comprised of Group VIII metals on a zeolite cracking base. Non-limiting example of these metals may include iron, cobalt, nickel, molybdenum and platinum. Due to the exothermic nature of the catalytic reaction, heat is generated in the catalytic reaction zone at the bottom of the reactor and the generated heat is distributed throughout the reactor.

The catalyst may be added or removed in the present system without shutting down the process. In a preferred embodiment, a portion of the residual liquid product exiting the residual outlet line 64 may be directed by inlet line 68 to a pump 70 through valving 72, 74, 76 and 78 through a buffer tank 80 having a catalyst addition system. Accordingly, the amount of catalyst may be monitored, varied and controlled. Finally, the residual liquid product returns to the catalytic reaction zone 50 of the reactor vessel 34 via a return line 84. The unconverted heavier residual liquid is thus recycled with catalyst to increase higher residual conversion.

The highest concentrations of hydrogen gas and catalyst are present at the bottom of the vessel, thus providing increased efficiency for the conversion of difficult to react resid, in which asphaltenes, sulphur, nitrogen and metal compounds are present.

Using thermal zones at the top provides less cracking of already converted hydrocarbons which have been converted at the catalytic zone, thus avoiding formation of excessive by products.

The catalytic zone is integral with the liquid phase thermal reaction zone in the present invention. Because of its specific gravity, the heavier catalyst tends to stay in the catalytic zone.

The present invention provides a number of advantages. In contrast to a conventional cocurrent upflow reactors, in this design clogging coking and solid settlement are reduced. Additionally, the amount of catalyst in the system may be both monitored and controlled in continuous mode.

In the present system, the hydrogen gas velocity and volume is much lower (for example, 2–7 cm/sec) than in the known cocurrent designs (5–10 cm/sec) since the liquid and catalyst in the present system is permitted to move downwards by gravity whereas in existing co-current slurry reactors high hydrogen velocity is required to carry heavy unconverted resid and catalysts to the vessel top. The present design also requires a smaller ratio of hydrogen/feedstock than in cocurrent The present invention is designed to handle extra heavy crude in a combination of thermal and catalytic zones with overall improved thermal and operating efficiency.

The incoming feedstock is preheated well below (150°–500° F., 180°–250° C.) reaction conditions which reduces possibilities of fouling of the feedstock inlet lines.

Additionally, the heat generated by the exothermic reaction in the catalytic zone is used to heat the liquid phase thermal zone and the gas phase thermal zone. Moreover, the same heat is used to heat the feedstock and/or hydrogen containing gas, making the system economical to operate. Finally, any problems with runaway temperature in the thermal zone could be controlled by controlling the feed temperature, thus avoiding use of any cold stream injecting system.

Whereas, the present invention has been described in relation to the drawings attached hereto, it should be understood that other and further modifications, apart from those shown or suggested herein, may be made within the spirit and scope of this invention.

What is claimed is:

1. A process for combined thermal and catalytic treatment of heavy petroleum in a slurry phase counterflow reactor, which process comprises:

a) introducing a liquid feedstock at a top of a reactor vessel to a gas phase thermal reaction zone and thermally reacting said liquid feedstock;

b) injecting a gas comprising hydrogen near a bottom of said reactor vessel in a catalytic reaction zone;

c) passing said liquid from said gas phase thermal reaction zone to a liquid phase thermal reaction zone in said reactor vessel below and in communication with said gas-phase thermal reaction zone and thermally reacting said reacted liquid therein;

d) passing said reacted liquid from said liquid phase thermal reaction zone to a catalytic reaction zone below said liquid phase thermal reaction zone and hydrogenating said reacted liquid therein; and e) dispersing said hydrogen through said catalytic reaction zone, through said liquid phase thermal reaction zone and through said gas-phase zone and thereafter separating said hydrogen along with gaseous hydrocarbon products from said thermal and chemical reactions.

2. A process for combined thermal and catalytic treatment as set forth in claim 1 including the additional steps of:

withdrawing heavy unconverted residual product from said bottom of said reactor vessel;

directing at least a portion of said heavy residual product removed to a catalyst addition system having a buffer tank; and introducing catalyst to said reactor vessel from said catalyst addition system to said catalytic reaction zone.

3. A process for combined thermal and catalytic treatment as set forth in claim 1 wherein said hydrogen gas is injected into said reactor vessel at said catalytic reaction zone and said hydrogen gas is dispersed through said vessel.

4. A process for combined thermal and catalytic treatment as set forth in claim 1 wherein said hydrogen gas is injected at a temperature exceeding the temperature of said catalytic reaction zone.

5. A process for combined thermal and catalytic treatment as set forth in claim 1 including the additional step of encouraging mixing of said liquid in said liquid phase thermal reaction zone through the use of a plurality of vertical baffles.

6. A process for combined thermal and catalytic treatment as set forth in claim 1 including the additional step of filtering said withdrawing hydrogen gas with gaseous hydrocarbon product through a filter to remove solids.

7. A process for combined thermal and catalytic treatment as set forth in claim 1 including the additional step of detecting the level of said liquid in said liquid phase thermal reaction zone in said reactor vessel.

8. A process for combined thermal and catalytic treatment as set forth in claim 1 including the additional, initial step of passing said liquid feedstock in heat exchange with said withdrawing hydrogen gas and hydrocarbon product to heat said liquid feedstock.

9. A process for combined thermal and catalytic treatment as set forth in claim 1 wherein said step of introducing liquid feedstock to a top of a reactor vessel is below a porous metal filter screen.

10. A process for combined thermal and catalytic treatment as set forth in claim 1 wherein said step of introducing liquid feedstock at said top of said reactor vessel is through a nozzle.

11. A process for combined thermal and catalytic treatment as set forth in claim 1 including the additional step of separating said withdrawn hydrogen gas from said gaseous hydrocarbon product and recirculating through said catalytic zone.

12. A process for combined thermal and catalytic treatment as set forth in claim 1 including controlling and monitoring pressure by a pressure let down system.

13. A process for combined thermal and catalytic treatment as set forth in claim 1 wherein pressure in said reactor vessel is maintained at 1500–2000 PSIG and temperature is maintained at 450° F.–850° F.

* * * * *

UNITED STATES PATENT AND TRADEMARK OFFICE
CERTIFICATE OF CORRECTION

PATENT NO. : 6,755,962 B2
APPLICATION NO. : 09/852107
DATED : June 29, 2004
INVENTOR(S) : Dwijen K. Banerjee It is certified that error appears in the above-identified patent and that said Letters Patent is hereby corrected as shown below:

Column 3, line 19, delete "atypical" and insert therefore --a typical--.
Column 5, line 49, after "cocurrent" add --slurry reactors.--

Signed and Sealed this

Twenty-sixth Day of February, 2008

JON W. DUDAS
*Director of the United States Patent and Trademark Office*